United States Patent [19]

Cole, Jr. et al.

[11] 4,308,162
[45] Dec. 29, 1981

[54] NOVEL YELLOW AZO DYES AND DICHROIC LIQUID CRYSTAL COMPOSITIONS MADE THEREWITH

[75] Inventors: Herbert S. Cole, Jr., Scotia; Siegfried Aftergut, Schenectady, both of N.Y.

[73] Assignee: General Electric Company, Schenectady, N.Y.

[21] Appl. No.: 214,369

[22] Filed: Dec. 8, 1980

[51] Int. Cl.$^3$ .......................... C09K 3/34; G02F 1/13; C09B 31/16
[52] U.S. Cl. ............................... 252/299.1; 260/173; 350/349
[58] Field of Search .................. 252/299.1, 299.68; 350/349

[56] References Cited

U.S. PATENT DOCUMENTS

| | | | |
|---|---|---|---|
| 3,864,022 | 2/1975 | Moriyama et al. | 252/299.1 |
| 3,960,750 | 6/1976 | Moriyama et al. | 252/299.1 |
| 4,032,219 | 6/1977 | Constant et al. | 252/299.1 |
| 4,032,470 | 6/1977 | Bloom et al. | 252/299.7 |
| 4,098,301 | 7/1978 | Bloom et al. | 252/299.1 |
| 4,116,861 | 9/1978 | Aftergut et al. | 252/299.1 |
| 4,122,027 | 10/1978 | Cole, Jr. et al. | 252/299.1 |
| 4,128,496 | 12/1978 | Cole, Jr. et al. | 252/299.1 |
| 4,128,497 | 12/1978 | Cole, Jr. et al. | 252/299.1 |
| 4,137,193 | 1/1979 | Osman et al. | 252/299.1 |
| 4,141,627 | 2/1979 | Bloom | 252/299.1 |
| 4,145,114 | 3/1979 | Coates et al. | 252/299.1 |
| 4,153,343 | 5/1979 | Bloom et al. | 252/299.1 |
| 4,184,750 | 1/1980 | Bloom et al. | 252/299.1 |
| 4,211,473 | 7/1980 | Shanks | 252/299.1 |

FOREIGN PATENT DOCUMENTS

| | | | |
|---|---|---|---|
| 2902177 | 7/1980 | Fed. Rep. of Germany | 252/299.1 |
| 55-127485 | 2/1980 | Japan | 252/299.1 |
| 1459046 | 12/1976 | United Kingdom | 252/299.1 |

OTHER PUBLICATIONS

Bloom, A., et al., Mol. Cryst. Liq. Cryst., vol. 40, pp. 210-221 (1977).
Bloom, A., et al., Mol. Cryst. Liq. Cryst., vol. 41 (Letters) pp. 1-4 (1977).
Cox, R. J., Mol. Cryst. Liq. Cryst., vol. 55, pp. 1-32 (1979).
White, D. L., et al., J. Appl. Phys., vol. 45, No. 11, pp. 4718-4723 (1974).
Blinov, L., et al., J. Phys. (Paris), vol. 36, Cl., No. 3, pp. 69-76 (1975).

*Primary Examiner*—Teddy S. Gron
*Attorney, Agent, or Firm*—Geoffrey H. Krauss; James C. Davis; Marvin Snyder

[57] ABSTRACT

Novel yellow azo dye compositions and novel liquid crystal compositions containing the yellow azo dye composition. The yellow azo dye composition, having terminal ester groups, has the general formula:

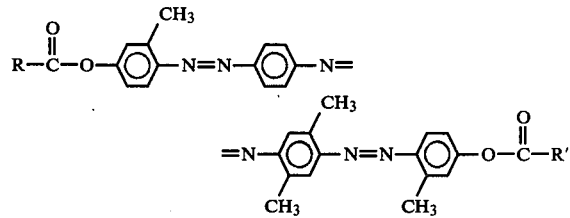

wherein R and R' are alkyl or substituted alkyl wherein the alkyl has at least 4 carbon atoms, aryl, arylalkyl, substituted aryl or substituted arylalkyl. When the yellow azo dichroic dyes are used alone, or in combination with other dyes, as a guest in a host liquid crystal material, they form a novel liquid crystal composition for use in liquid crystal displays. An invention method of improving the black color of dichroic dyes for use in black liquid crystal displays, wherein a dye composition having a mixture of dichroic dyes of various colors and containing at least one yellow azo dichroic dye, as described above, is added to a host liquid crystal material. The mixture of dichroic dyes of various colors must be one which absorbs radiation in the spectral range of about 400-700 nm to produce the substantially black color for use in black liquid crystal displays.

21 Claims, No Drawings

NOVEL YELLOW AZO DYES AND DICHROIC LIQUID CRYSTAL COMPOSITIONS MADE THEREWITH

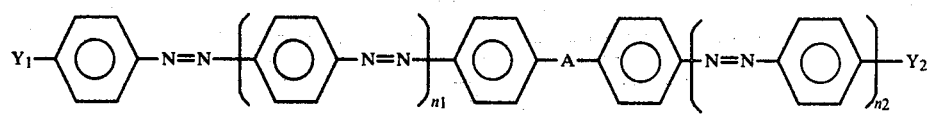

BACKGROUND OF THE INVENTION

This invention relates to yellow azo dye compounds, and more particularly, to dichroic liquid crystal compositions containing the yellow azo dyes.

Yellow dyes having improved properties are desirable for various applications including the dyeing of textiles and the coloring of plastics and liquid crystal displays. Among those properties which are desirable for dyes, especially for dyes used in liquid crystal displays, are photostability of the dye, suitable extinction coefficient of the dye, solubility of the dye in liquid crystal hosts and light absorption in the desired spectral region. In liquid crystal displays, yellow dyes are especially useful for modifying the color of other dyes or as additives for black dichroic formulations. The fabrication of black liquid crystal displays poses a particular problem in that no black dichroic dyes are known, and black liquid crystal displays are made by mixing dichroic dyes of various colors in proper proportions to obtain a material which absorbs light radiation in the spectral range of about 400–700 nm resulting substantially in a black color. The dyes used in such mixtures must have a high order parameter, preferably at least 0.75, to ensure satisfactory brightness and contrast ratio.

Heretofore, the only available yellow dyes of high order parameter contained Schiff base linkages within the dye molecule, and the presence of a double or triple bond in the base unit of the dye (exclusive of substituted groups and derivatives), leads to chemical and/or photochemical instability of the material.

Dye compounds suitable for use in solution with a liquid crystal material and containing azo linkages rather than Schiff base linkages in the dye molecule, are well known in the prior art. In U.S. Pat. No. 4,145,114, there is a disclosure of a substantial number of dye compounds suitable for use in liquid crystal materials and having an azo or azoxy linkage of the following general formula:

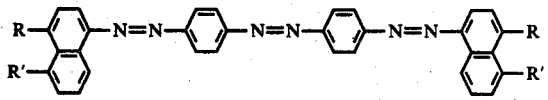

or a substituted derivative of the foregoing formula in which any one of the positions on any one of the benzene rings is substituted by halogen, methyl, halogen substituted methyl, or methoxy; wherein A is an azo or azoxy linkage group; $n_1$ and $n_2$ are each integers in the inclusive range 0 to 4; and $Y_1$ and $Y_2$ are each one of the following groups: (i) hydrogen; or (ii) OR where R is an alkyl or arylalkyl group. Although the general structure of the dyes of U.S. Pat. No. 4,145,114 avoid the Schiff base likages and thereby eliminate the chemical and/or photochemical instability disadvantages of materials containing the Schiff base linkages, it is always desirable to improve azo dyes and to improve liquid crystal displays containing azo dyes.

The present inventors describe in U.S. Pat. No. 4,122,027, certain dichroic dyes of the 4,4′-bis(substituted naphthylazo)azobenzene type, each having three azo bonding groups, namely seven dyes having the general formula:

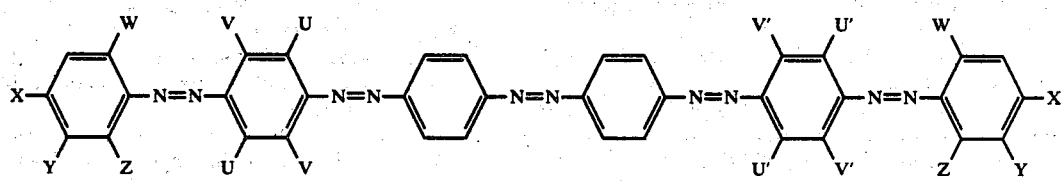

and in U.S. Pat. No. 4,179,395, certain dichroic dyes are described having the general formula:

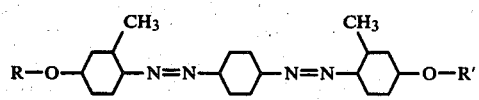

In pending application Ser. No. 175,003, filed Aug. 4, 1980, the present inventors describe certain yellow azo dichroic dyes having the general formula:

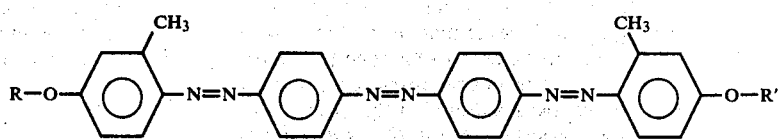

in which R and R′ are acyl. Copending application Ser. No. 175,002, also filed Aug. 4, 1980 teaches certain yellow azo dichroic dyes of the general formula:

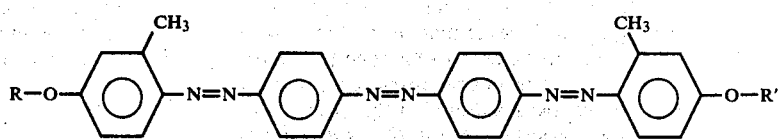

in which R and R′ are acyl. Also, in application Ser. No. 175,004, also filed Aug. 4, 1980, yellow azo dyes having the general formula:

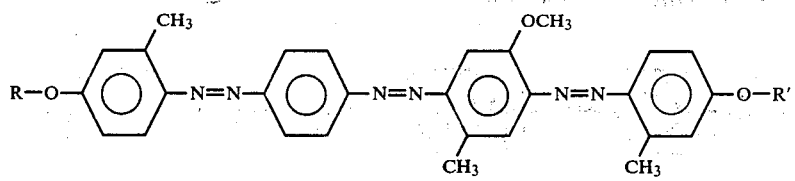

where R and R' are acyl are described. The above applications and patents are incorporated herein by reference in their entireties.

BRIEF SUMMARY OF THE INVENTION

In accordance with one aspect of the invention, novel yellow azo dyes are provided by aliphatic and aromatic esters of 4,4'-bis(2-methyl-4-hydroxyphenylazo)-2,5-dimethylazobenzene. A class of yellow azo dyes comprising the general formula:

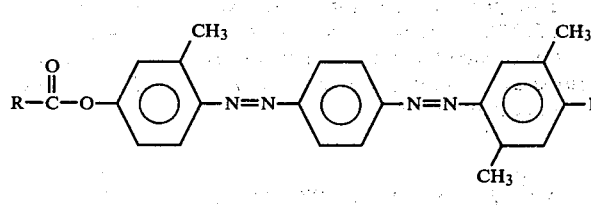 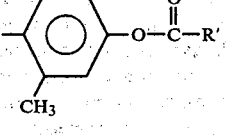

wherein R and R' are individually alkyl or substituted alkyl wherein the alkyl has at least 4 carbon atoms or $R_2$ is an aryl, arylalkyl, substituted aryl, or substituted arylalkyl, has been discovered in accordance with the present invention. The acyl groups in the general formula form terminal ester groups at the hydroxy positions of the 4,4'-bis(2-methyl-4-hydroxyphenylazo)-2,5-dimethylazobenzene.

In accordance with another aspect of the present invention, there is also provided a liquid crystal composition for use in a liquid crystal display, comprising:
 a host liquid crystal material; and
 a guest dye dissolved in said host liquid crystal material, said dye being of the formula I set forth above.

In another embodiment of the present invention, it has been found that when a liquid crystal composition for use in a liquid crystal display comprises a host liquid crystal material and a guest yellow dye dissolved in said host liquid crystal material in conjunction with other dichroic dyes of various colors which absorb radiation within the spectral range of about 400–700 nm, improved black liquid crystal compositions can be obtained when said yellow dye is of the formula I. Thus, improved black liquid crystal compositions and a method for improving the quality of black liquid crystal compositions are possible by using the yellow dichroic azo dyes having at least one terminal ester linkage in the paraposition on an ortho-methyl substituted phenylazo azobenzene and one of the benzene rings of the azobenzene has methyl groups substituted in the 2- and 5-positions, in a dye having at least three azo linkages. Thus, the invention embraces a method of improving the black color of dichroic dyes for use in black liquid crystal displays, comprising adding to a host liquid crystal material, a dye composition having a mixture of dichroic dyes of various colors in proper proportion to obtain a material which absorbs radiation in the spectral range of about 400–700 nm wherein at least one of the dichroic dyes of various colors is a yellow azo dichroic dye of formula I; and heating the composition to dissolve the dyes in the liquid crystal host material.

In accordance with the present invention, the chemical and/or photochemical instability of the prior art has been substantially reduced by using the azo linkages in the yellow azo dichroic dyes having terminal ester groups. Furthermore, a new class of yellow dyes has been synthesized, and liquid crystal displays of various colors can be fabricated by mixing at least one of the new class of yellow azo dyes with at least one dichroic dye of a different color and dissolving the mixture in a host liquid crystal material.

Accordingly, it is the primary object of the present invention to provide yellow azo dyes having a novel chemical composition.

It is another object of the present invention to provide novel liquid crystal compositions for use in liquid crystal displays.

Another object of the present invention is to provide yellow azo dyes having improved chemical and/or photochemical stability for use in liquid crystal compositions.

Another object of the present invention is to provide improved black dichroic liquid crystal displays made by mixing dichroic dyes of various colors.

Yet another object of the present invention is to provide a method of improving the black color of dichroic dyes used in black liquid crystal displays.

Still another object of the present invention is to provide a class of yellow dyes devoid of Schiff base linkages.

These and various other objects, features and advantages of the invention can be best understood from the following detailed description.

DETAILED DESCRIPTION OF THE INVENTION

The yellow azo dyes or guest yellow azo dyes of the present invention have been synthesized by a reaction which produces the following general formula representing the class of yellow azo dyes

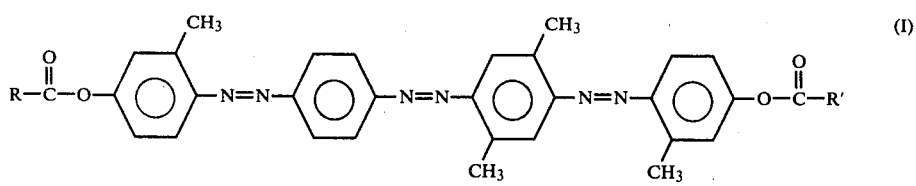

$$R-\overset{O}{\underset{\|}{C}}-O-\underset{CH_3}{\overset{CH_3}{\bigcirc}}-N=N-\bigcirc-N=N-\underset{CH_3}{\overset{CH_3}{\bigcirc}}-N=N-\bigcirc-O-\overset{O}{\underset{\|}{C}}-R' \quad (I)$$

having a relatively elongated and rigid molecular structure. The yellow dyes have three azo (—N=N—) linking groups, one of the azo linking groups joining an unsubstituted benzene ring to a benzene ring having methyl groups substituted in the 2-position and the 5-position, and the other two azo groups joining the foregoing substituted and unsubstituted benzene rings at the paraposition to a third and fourth benzene ring having a methyl group substituted in the ortho-position (relative to the azo linkage) and an ester group substituted in the paraposition (relative to the azo linkage), so that the parasubstituted ester forms the terminal portion of the yellow azo dye molecule. The ester end groups or terminal ester groups normally designated as auxochromes, e.g., electronwithdrawing groups or electron-repelling groups, enhance the characteristic yellow color of the dyes by enhancing absorption at the blue end of the spectrum, e.g., 380–430 nm. R and R' in the general formula for the yellow azo dyes and guest yellow azo dyes, are part of the acyl groups which form the ester. In accordance with preferred embodiments of the present invention, R=R'; however, it is within the scope of the present invention to provide dyes of the general formula wherein R and R' comprise different groups, and in fact, R and R' may represent any combination of alkyl, substituted alkyl, aryl, arylalkyl, substituted aryl or substituted arylalkyl as specified in this invention.

The acyl groups of the present invention containing R and R' in the general formula I, have the following general formula:

$$R_2-C\overset{\displaystyle O}{\underset{\displaystyle \diagdown}{\diagup}}$$

The acyl group is a functional group, and as used herein, is generally the functional group of an acid chloride. In various embodiments, the acyl group of the yellow azo dyes of the present invention, may be an aromatic (aryl) group or a substituted aromatic group or mixtures thereof. However, the acyl group may also be an aliphatic (alkyl), substituted aliphatic, arylalkyl or substituted arylalkyl or mixtures thereof. Thus, in accordance with the present invention, $R_2$ in the formula representing the acyl groups, may be aryl, arylalkyl, substituted aryl, substituted arylalkyl, alkyl having at least 4 carbon atoms or substituted alkyl having at least 4 carbon atoms, or mixtures of the foregoing.

The dyes of the present invention may be synthesized by any suitable manner. In one preferred method of synthesis, 2,5-dimethyl-azodianiline is tetrazotized using sodium nitrite and dilute hydrochloric acid. The tetrazonium solution is then coupled with meta-cresol in a basic solution to give 4,4'-bis(2-methyl-4-hydroxyphenylazo)-2,5-dimethylazobenzene. This product is then reacted with the appropriate acid chloride in a suitable solvent, for example, pyridine. The mixture is heated for an appropriate time and at a suitable temperature to complete the reaction, e.g., about 1–4 hours at about 80° C.–120° C. Upon cooling, the yellow dye precipitates and is collected. In certain instances, hexane or other suitable aliphatic hydrocarbons may be used to promote precipitation. In the foregoing synthesis, for every mole of 2,5-dimethyl-azodianiline, about two moles of hydrochloric acid and about two moles of sodium nitrite were used. Two moles of the coupling agent (m-cresol) was used for every mole of 2,5-dimethyl-azodianiline. If both acyl groups on the dye molecule are the same, a slight molar excess of the appropriate acid chloride, such as benzoyl chloride, may be used. If the acyl groups differ on the same molecule, the acylation is carried out in two separate steps. The first acylation is carried out with about one mole of the appropriate acid chloride per mole of 2,5-dimethyl-azodianiline derivative in a basic solution such as an organic base (pyridine), and the solution is heated at a suitable temperature until the reaction is complete, e.g., it is heated for three hours at 110° C. A second acylation is carried out with about one mole of the appropriate acid chloride per mole of the monoester of 2,5-dimethylazodianiline derivative in a basic solution such as an organic base (pyridine), and the solution is heated at a suitable temperature until the reaction is complete, e.g., it is heated for three hours at 110° C. Thereafter, the solution is cooled. The yellow dye precipitates and is collected. A precipitation agent, such as n-hexane, may be added to promote the precipitation of the dye from the solution.

In preferred embodiments, the acyl group represented by the formula:

$$R_2-C\overset{\displaystyle O}{\underset{\displaystyle \diagdown}{\diagup}}$$

is an aromatic or substituted aromatic group designated herein as an aryl or substituted aryl group. As used herein, aryl generally refers to a phenyl group or a naphthyl group. Examples of several acyl groups which form the ester linkage with the 4,4'-bis(2-methyl-4-hydroxyphenylazo)-2,5-dimethylazobenzene intermediate formed from the tetrazonium solution and the m-cresol as discussed above, are shown in Table 1 below where the illustrated acyl group represents any combination of R and R' in the general formula of this invention but preferably where R=R'.

TABLE 1

| | EXAMPLE OF YELLOW OR YELLOW-ORANGE AZO DYES HAVING ACYL GROUPS | |
|---|---|---|
| Dye NO. | ACYL Group (RCO and R'CO) of GENERAL FORMULA | CORRESPONDING ACID CHLORIDE |
| 1. | ⬡—C(=O)— | benzoyl chloride |

TABLE 1-continued
EXAMPLE OF YELLOW OR YELLOW-ORANGE
AZO DYES HAVING ACYL GROUPS

| Dye NO. | ACYL Group (RCO and R'CO) of GENERAL FORMULA | CORRESPONDING ACID CHLORIDE |
|---|---|---|
| 2. | H₃CO—⌬—C(=O)— | p-anisoyl chloride |
| 3. | H₁₁C₅O—⌬—C(=O)— | 4-pentoxybenzoyl chloride |
| 4. | H₁₅C₇O—⌬—C(=O)— | 4-heptoxybenzoyl chloride |
| 5. | 3,5-(OCH₃)₂-C₆H₃-C(=O)— | 3,5-dimethoxybenzoyl chloride |
| 6. | H₁₁C₅—⌬—C(=O)— | 4-pentylbenzoyl chloride |
| 7. | H₁₅C₇—⌬—C(=O)— | 4-heptylbenzoyl chloride |
| 8. | N≡C—⌬—C(=O)— | 4-cyanobenzoyl chloride |
| 9. | O₂N—⌬—C(=O)— | p-nitrobenzoyl chloride | gen, nitro, cyano, amino, alkyl, aryloxy, biaryl, alkoxy derivatives substituted upon the aryl group, mixtures and combinations of the foregoing derivatives substituted upon the aryl group, and the like. Other exemplary aromatic acyl groups preferred in accordance with the present invention include para-n-decylbenzoyl, p-ethoxybenzoyl, p-butoxybenzoyl, p-hexyloxybenzoyl, p-N,N-dimethylaminobenzoyl, p-N,N-diethylaminobenzoyl, p-N,N-dibutylaminobenzoyl, p-hydroxybenzoyl, p-chlorobenzoyl, p-bromobenzoyl, p-benzoyloxybenzoyl, p-phenoxybenzoyl, p-toluyl, p-ethylbenzoyl, and p-phenylbenzoyl. Naturally, it is within the purview of one skilled in the art to add a considerable number of acyl groups to the foregoing list. As explained above, dyes of the general formula with different R and R' groups can be synthesized by the reaction of one mole of the 4,4'-bis(2-methyl-4-hydroxyphenylazo)2,5-dimethylazobenzene intermediate with one mole of the appropriate acyl chloride to provide a reaction product having one acyl group thereon, followed by the reaction of one mole of the reaction product having one acyl group thereon with one mole of another appropriate acyl chloride to form the yellow azo dye composition having two different acyl groups thereon.

For example, in a first reaction, about 1.0 mole of benzoyl chloride per mole of the 4,4'-bis(2-methyl-4-hydroxyphenylazo)-2,5-dimethylazobenzene intermediate is heated at about 110° C. for about three hours to form an ester as follows:

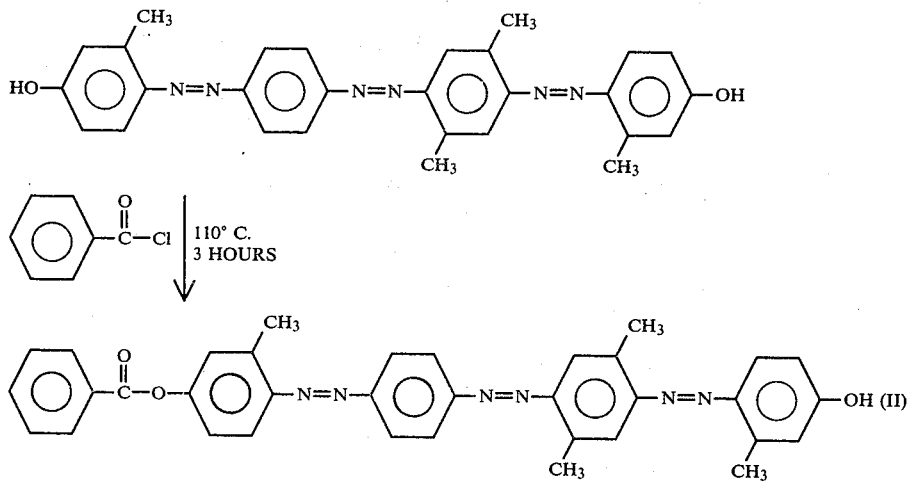

Other aromatic (aryl) acyl groups can be used in the general formula and can be prepared from the corresponding acid chloride. Other aryl groups include benzene (phenyl) and naphthalene (naphthyl) and the halo- In a second reaction, about 1.0 mole of p-anisoyl chloride per mole of the ester of formula (II) above is heated at about 100° C. for about three hours under the reaction conditions discussed above to form an ester (III) as follows:

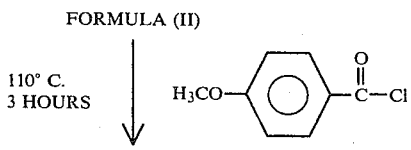

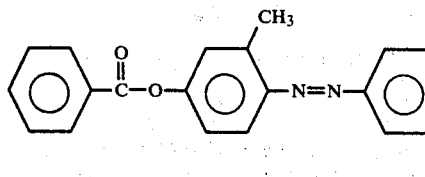 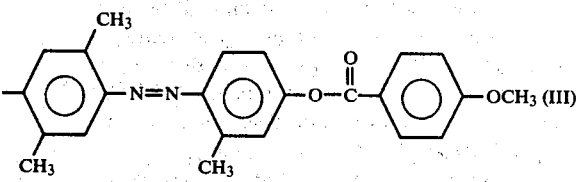

(III)

The yellow azo dye (III) is 4-(2-methyl-4-benzoyloxy phenylazo)-4'-(2-methyl-4-anisoyloxy phenylazo)-2,5-dimethylazobenzene.

The acyl groups of the present invention may also be alkyl or substituted alkyl acyl groups wherein the alkyl or substituted alkyl has at least 4 carbon atoms. The acyl groups of the present invention can also be arylalkyl or substituted arylalkyl acyl groups. Thus, in accordance with the general formula of this invention, R and R' may be a part of the foregoing enumerated acyl groups of the formula:

wherein $R_2$ is an alkyl or substituted alkyl and the alkyl has at least 4 carbon atoms, or $R_2$ can be arylalkyl or substituted arylalkyl. The substituted groups may be any of the conventional derivatives well known in the art including the halogens (e.g., chlorine and bromine), hydroxy, nitro, cyano, amino, alkyl, aryloxy, alkoxy, and the like, and various combinations and permutations of the foregoing derivatives. In preferred embodiments, the foregoing acyl derivatives can be obtained by using the corresponding acid chloride in the synthesis described above. In accordance with the present invention, the acyl groups on the yellow azo dye molecule can be the same or different groups including different alkyl or substituted alkyl or different arylalkyl or substituted arylalkyl groups and can also comprise the foregoing groups mixed with aromatic acyl groups.

When the invention has alkyl or substituted alkyl acyl groups, in preferred embodiments, the alkyl or substituted alkyl has about four to about 20 carbon atoms. Preferred alkyl groups include n-butyl, iso-butyl, n-amyl, n-hexyl, n-heptyl, n-octyl, n-nonyl, n-decyl and stearyl and the like and the halogen (e.g., chlorine and bromine), nitro, amino, hydroxy and cyano derivatives thereof.

Specific examples of alkyl acid chlorides which may be used in a reaction with the 4,4'-bis(2-methyl-4-hydroxy-phenylazo)-2,5-dimethylazobenzene intermediate described above in the appropriate molar quantities include n-butyryl chloride, iso-butyric acid chloride, n-valeryl chloride, iso-valeryl chloride, n-caprylic acid chloride (octanoyl chloride), pelargonic acid chloride (pelargonyl chloride or nonanoyl chloride), n-caproic acid chloride (n-caproyl chloride), n-capric acid chloride, stearic acid chloride (stearyl chloride), palmityl chloride, and the like.

Examples of the above yellow azo dyes having alkyl acyl groups are shown in Table 2 below where the acyl group and the corresponding acid chloride are illustrated:

TABLE 2
EXAMPLES OF YELLOW AZO DYES HAVING ALKYL ACYL GROUPS

| DYE NO. | ACYL GROUP (RCO— and R'CO—) OF GENERAL FORMULA | CORRESPONDING ACID CHLORIDES |
|---|---|---|
| 1. | $C_2H_5—CH_2—\overset{O}{\underset{\|}{C}}—$ | n-butyryl chloride |
| 2. | $(CH_3)_2—CH—\overset{O}{\underset{\|}{C}}—$ | iso-butyric acid chloride |
| 3. | $CH_3—(CH_2)_3—\overset{O}{\underset{\|}{C}}—$ | n-valeryl chloride |
| 4. | $(CH_3)_2—CH—CH_2\overset{O}{\underset{\|}{C}}—$ | iso-valeryl chloride |
| 5. | $CH_3—(CH_2)_6—\overset{O}{\underset{\|}{C}}—$ | octanoyl chloride |
| 6. | $CH_3—(CH_2)_4—\overset{O}{\underset{\|}{C}}—$ | n-caproyl chloride |
| 7. | $CH_3—(CH_2)_7—\overset{O}{\underset{\|}{C}}—$ | pelargonyl chloride |
| 8. | $CH_3—(CH_2)_8—\overset{O}{\underset{\|}{C}}—$ | n-capric acid chloride |
| 9. | $C_{17}H_{35}—\overset{O}{\underset{\|}{C}}—$ | stearyl chloride |
| 10. | $C_{15}H_{31}—\overset{O}{\underset{\|}{C}}—$ | palmityl chloride |

To prepare the yellow azo dyes of this invention having alkyl acyl groups, substituted alkyl acyl groups, arylalkyl acyl groups, or substituted arylalkyl acyl groups, the corresponding acid chloride (acyl chloride) is reacted with the 4,4'-bis(2-methyl-4-hydroxyphenylazo)-2,5-dimethylazobenzene intermediate in the same manner described above for the preparation of the aromatic acyl compounds. Thus, 2,5-dimethyl-azodianiline is tetrazotized to form an intermediate tetrazonium chloride solution which is coupled with m-cresol in a basic solution to yield the 4,4'-bis-(2-methyl4-hydroxy-phenylazo)-2,5-dimethyl-azobenzene intermediate. This product is then reacted with the appropriate aliphatic (alkyl) acid chloride or arylaliphatic (arylalkyl) acid chloride as discussed above. A slight molar excess of the appropriate aliphatic acid chloride is added to the 4,4'-bis(2-methyl-4-hydroxyphenylazo)-2,5-dimethyl-azobenzene intermediate to produce the yellow azo dye product. For example, slightly over 2 moles of stearyl chloride is added to the 4,4'-bis-(2-methyl-4-hydroxy-phenylazo)-2,5-dimethyl-azobenzene in pyridine solvent, and the mixture is heated for about three hours at about 110° C. to form the product. Upon cooling, the yellow azo dye precipitates and may be filtered from the solution. Conventional precipitating promoters, such as n-hexane, can be added to promote precipitation.

The yellow azo dyes prepared in accordance with this invention can be used in any conventional manner. For example, they can be used alone or in combination with other dyes, modifiers or adjuvants to dye textiles or to color plastic materials. They can be used alone or in combination with other dyes, modifiers or adjuvants to color liquid crystal displays. In preferred embodiments, the yellow azo dyes are used with liquid crystal host materials well known in the art to improve the color of the liquid crystal composition for use in a liquid crystal display. When the yellow azo dyes of this invention are used with a liquid crystal host, they are called guest dyes, and they are dissolved in the host liquid crystal material, that is, the guest yellow azo dye is soluble in the host liquid crystal material. Many of the yellow azo dyes require mild heat, e.g., above ambient to 110° C. to promote their dissolution in the host liquid crystal.

Any liquid crystal host material may be used in accordance with the present invention. In those embodiments of the present invention wherein the yellow tris-azo dichroic dye material is used as a guest dye in a host liquid crystal material, it is not critical which of the many well known liquid crystal materials or combinations thereof may be used as long as the yellow azo dye materials of the present invention are soluble in the host liquid crystal material and as long as the yellow azo dye or dyes of the present invention are compatible with or have no adverse effect upon the host liquid crystal material. In preferred liquid crystal compositions of the present invention, the host liquid crystal material is a nematic liquid crystal of positive or negative dielectric anisotropy, a cholesteric liquid crystal of positive or negative dielectric anisotropy and mixtures thereof, that is, mixtures of nematic liquid crystals and cholesteric liquid crystals modified with other optically active compounds.

Any conventional liquid crystal host material can be used with the yellow tris-azo dyes of the present invention. The liquid crystal hosts can be selected by one skilled in the art depending upon the electro-optic effect to be utilized. Nematic liquid crystals include the biphenyl liquid crystals such as E-7 and E-8 from BDH, Ltd.

Biphenyl liquid crystal E-7 is a eutectic of the following general formula:

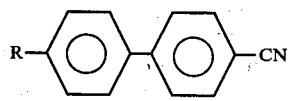

where R is a mixture of $C_5H_{11}$, $C_7H_{15}$, $C_8H_{17}O$ and

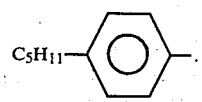

Other nematic liquid crystals include esters available from E. Merck Associates and HoffmanLaRoche Co., phenylcyclohexanes and azoxy mixtures available from E. Merck Associates, alkoxybenzylidene anils such as those having the structural formula:

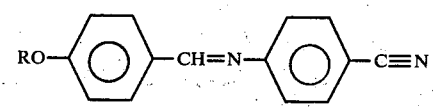

wherein OR is an alkoxy radical preferably having from 1 to 7 carbon atoms or an acyloxy radical having from 2 to 7 carbon atoms, p-anisylidene-p'-n-butylaniline, p-anisylidene-p'-aminophenyl-butyrate, p-(p'-methoxyphenylazoxy)butylbenzene, p-(p'-ethoxyphenylazo)-phenylheptanoate, p-n-hexylbenzoic acid-p'-n'-hexyloxy-phenyl ester, and other liquid crystal materials, such as the esters disclosed in U.S. Pat. No. 3,984,344, p-n-hexylbenzylidene-p'-amino-benzonitrile, p-capryloxybenzylidene-p'-aminobenzonitrile, p-cyanophenyl-p'-n-heptylbenzoate, p-cyanobenzylidine-p'-n-butoxyaniline, p-cyanobenzylidene-p'-aminophenylvalerate, p-azoxyanisole, butyl-p-(p'-ethoxyphenoxycarbonyl)phenylcarbonate, p(p'-ethoxyphenylazo)-phenylheptanoate, and the like. Another class of liquid crystal materials have the general formula:

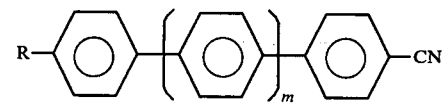

wherein R is an alkyl or alkoxy group and m=0 or 1, at least one of said compounds being cyanobiphenyl wherein m=0. Generally, nematic liquid crystals fall within the class of chemical compounds having the general formula:

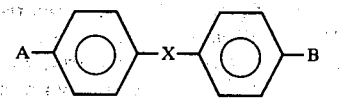

wherein X is an azomethine linkage of the Schiff base class, X is an ester, vinylene, acetylene, azo or azoxy, or X is merely a single bond connecting the two benzene rings; and A and B are $C_nH_{2n+1}$ (alkyl group); $C_nH_{2n+1}O$ (alkoxy group); or $C_nH_{2n+1}COO$ (ester group). Cholesteric liquid crystals can be pure compounds such as derivatives of cholesterol or noncholesteric materials. These are characterized by optical activity arising from the absence of molecular symmetry.

In accordance with the present invention, it is not critical how much of the dye is present in the host liquid crystal as long as the dye is soluble therein. In preferred embodiments, about 0.05% by weight to about 1.0% by weight, and more preferably about 0.1% by weight to about 0.5% by weight, (based upon the weight of the liquid crystal host material) of the dye of this invention or mixtures of dyes of this invention are present in the host liquid crystal. One skilled in the art can adjust the amount of yellow tris-azo dye as desired and can determine the amount required for maximum absorption at a particular wavelength. The upper limit of the amount of dye varies with the solubility of the particular dye in the host liquid crystal. The amount of guest dichroic yellow tris-azo dye of the present invention in the host liquid crystal material is that amount up to the limit of maximum solubility in the host of yellow tris-azo dye required to color, tint or shade the host liquid crystal, required to add to the yellow color of the host liquid crystal material, or required to contribute to the color of a mixture of dyes used in the host liquid crystal material, e.g., the use of the yellow dye or dyes of this invention with dyes of other colors to improve the "blackness" of guest dyes in the host liquid crystal. The guest yellow azo dichroic dyes of this invention are particularly useful in black liquid crystal displays because improved black liquid crystal materials can be obtained by mixing dichroic dyes of various colors in proper proportions to obtain a material which absorbs radiation in the spectral range of about 400-700 nm, and the yellow azo dyes of this invention substantially improve the absorption in the 400 nm region (the blue region) of such dye mixtures. Thus, in accordance with the present invention, an improved method of making black dichroic dyes or black dichroic liquid crystal displays is achieved by providing a host liquid crystal material and mixing therewith dichroic dyes of various colors in suitable proportions to obtain a material which absorbs radiation in the spectral range of about 400-700 nm wherein the dichroic dyes of various colors include a dye having the general formula I which has been set out hereinbefore. The appropriate mixture of dichroic dyes of various colors in suitable proportions to obtain a material which absorbs radiation in the spectral range of about 400-700 nm, and which approaches a substantially black appearance in color, is within the purview of one skilled in the art, and the improvement of the present invention is directed to the use of one or more of the yellow tris-azo dyes having the designated acyl or ester groups to improve the "blackness" of the dichroic dye mixture made from various colors. For example, the yellow tris-azo dyes of this invention, when mixed with appropriate blue dye in a liquid crystal, produce an improved greenish-black display. The yellow tris-azo dyes of this invention used in such mixtures have substantially high order parameters (S) generally at least 0.75 and above, to ensure satisfactory brightness and contrast ratio.

Two types of liquid crystal displays having two different liquid crystal hosts were prepared with the dyes of the present invention. In one of the types of liquid crystal display, the yellow azo dyes were dissolved at a concentration of about 0.5% to about 1% (by weight of the liquid crystal host material) in a nematic liquid crystal such as E-7 (from BDH Co.), ROTN-404 (from Hoffman LaRoche) or Licristal-1132 (from E. Merck Associates). The resulting solution was sandwiched between conductive glass plates in test cells whose surfaces are in contact with the solution, the surfaces having been previously rubbed unidirectionally. When illuminated with polarized light, the display switches from yellow in the absence of an applied voltage to substantially colorless in the presence of a voltage. In the other type of liquid crystal display used to demonstrate the present invention, the liquid crystal host was a cholesteric liquid crystal prepared by the addition of an optically active compound, such as CB-15 (from BDH Co.) to one of the above-mentioned nematic liquid crystal materials. The concentration of the optically active compound was varied from about 1% to about 10%. The yellow tris-azo dyes of this invention were dissolved at a concentration of about 0.5 to about 1.0% in the cholesteric host. Upon application of a voltage, the yellow display became substantially colorless.

Examples of specific commercial nematic liquid crystals include BDH Chemical's E-7 biphenyl type materials, whose temperature range is $-10°$ to $60°$ C. with a dielectric anisotropy of 11, and E-8 with a temperature range of about $-10°$ to $70°$ C. with a dielectric anisotropy of 13; E. Merck Associates' phenylcyclohexane type materials Licristal 1132 having a temperature range of $-6°$ to $70°$ C. with a dielectric anisotropy of 10 and Licristal 1221 having a temperature range of $-10°$ to $90°$ C. with dielectric anisotropy of 8; Hoffman-LaRoche's ROTN-103 an ester type having a temperature range from about $-10°$ to $80°$ C. with dielectric anisotropy of 26, ROTN-200, a Schiff base type having a temperature range of about $-15°$ to $65°$ C. with a dielectric anisotropy of 18, and ROTN-404, a biphenyl-pyrimidine type having a temperature range from about $-10°$ to $105°$ C. and a dielectric anisotropy of 21.

The following examples further illustrate the practice of the invention, and they are meant to be exemplary only and are not to be construed as to limiting the invention in any way.

EXAMPLE 1

Preparation of Tris-Azo Dye

The tetrazotization of 2,5-dimethyl-azodianiline was carried out by dissolving 0.02 moles (4.8 grams) of the azodianiline in about 60 mls. of dilute hydrochloric acid. The temperature of the resulting mixture was maintained at about 5° C. while adding about 3 grams (about 0.044 moles) of sodium nitrite in about 10 mls. of water. The resulting tetrazonium solution was then coupled with about 0.04 M of m-cresol, previously dissolved in dilute potassium carbonate (10%) and cooled to a temperature of about 5° C. The coupling reaction product was 4,4'-bis(2-methyl-4-hydroxyphenylazo)-2,5-dimethyl-azobenzene. This product was then reacted with about 0.04 M of 4-pentyloxybenzoyl chloride dissolved in pyridine. The solution was heated for about three hours at about 110° C. Upon cooling a yellow dye precipitated and was collected by filtration. The yellow dye is 4,4'-bis[2-methyl-4-(4-pentyloxybenzoxy)phenylazo]-2,5-dimethyl-azobenzene. The dye was dissolved in Merck 1291, a phenylcyclohexane liquid crystal commercially available and had a solubility on the order of 1%, an absorption maximum at 425 nm and an order parameter S of 0.78.

EXAMPLE 2

The yellow azo dye prepared in Example 1 above (1.0% by weight based upon the weight of the liquid crystal host material) is added to a liquid crystal host mixture of ROTN-404, a biphenyl-pyrimidine of positive dielectric anisotropy having a temperature range of $-10°$ C. to $105°$ C. The formulation was heated to dissolve the dye in the host material and then filtered. The resulting formulation was then placed in a test cell having a spacing between the cell substrates of about 18 microns and treated to give parallel alignment of liquid crystal upon the surface. When illuminated with polarized light, the display was yellow in the absence of any applied voltage and is substantially colorless in the presence of applied voltage.

EXAMPLE 3

Example 2 was repeated except that the liquid crystal host material was E-7.

EXAMPLE 4

Example 2 is repeated except that the liquid crystal host material is Licristal 1132.

EXAMPLE 5

Examples 2, 3 and 4 are repeated except that the liquid crystal host material contains about 5 wt.% of CB-15 optically active chiral dopant from BDH Ltd. CB-15 is 4-cyano-4'-(2-methylbutyl) biphenyl and converts the nematic liquid crystals into cholesteric liquid crystals.

EXAMPLE 6

Example 2 is repeated employing 0.5 wt.% of the yellow azo dye prepared in Example 1 and 0.5% of the yellow dye 4,4'-bis-[2-methyl-4-(4-pentoxybenzoxy)-phenylazo]-2-methyl-5-methoxyazobenzene.

Utility of the yellow tris-azo dyes of this invention has been demonstrated. When used alone the dyes can be used to provide yellow displays or they can be used as additives in conjunction with other dyes to provide improved black dyes for black dichroic displays when used with liquid crystals. The dyes of the present invention can also be used as additives with other dyes to obtain varied or unusual color effects in liquid crystal displays. Furthermore, the yellow tris-azo dyes of the present invention have been shown to be useful with a wide variety of liquid crystal compositions and are compatible with known liquid crystals, such as Schiff base, esters, azoxy, biphenyl, phenylcyclohexane, biphenyl/pyrimidinetype liquid crystals and the like. The novel yellow tris-azo dyes of the present invention can also be used for the dyeing of textiles, coloring of plastics or the coloring of any other media or substrates conventionally colored by azo dyes.

While other modifications of the invention and variations thereof which may be employed within the scope of the invention have not been described, the invention is intended to include such modifications as may be embraced within the following claims.

What is claimed is:

1. A liquid crystal composition for use in a liquid crystal display, comprising:
   a host liquid crystal material; and
   a guest dichroic dye dissolved in said host liquid crystal material, said dichroic dye having the general formula:

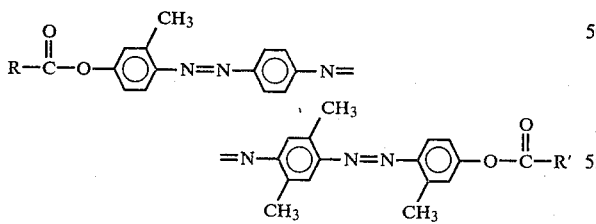

wherein R and R' are individually alkyl or halogen, nitro, amino, hydroxy or cyano substituted alkyl and the alkyl has from about 4 to about 20 carbon atoms, or phenyl; phenylalkyl; halogen, nitro, cyano, hydroxy, dialkylamino, amino, alkyl, phenyloxy, phenyl, or alkoxy parasubstituted phenyl or phenylalkyl; or 3,5-dialkoxyphenyl radical.

2. The composition of claim 1, wherein R=R'.

3. The composition of claim 1, wherein R and R' are selected from the group consisting of n-butyl, iso-butyl, n-amyl, n-hexyl, n-heptyl and stearyl and the halogen, nitro, amino and cyano derivatives thereof.

4. The composition of claim 1, wherein R and R' are an alkyl having from 4 to about 20 carbon atoms or the halogen, nitro, amino, or cyano derivatives thereof.

5. The composition of claim 1, wherein the phenyl or phenylalkyl parasubstituent is selected from the group consisting of halogen, hydroxy, nitro, cyano, amino, alkyl, phenyloxy and alkoxy.

6. The composition of claim 1, wherein R and R' are p-pentoxyphenyl.

7. The composition of claim 1, wherein about 0.05% by weight to about 1.0% by weight (based upon the weight of the liquid crystal) of the guest dichroic dye is dissolved in the host liquid crystal.

8. The composition of claim 1, wherein the host material comprises a nematic liquid crystal or a cholesteric liquid crystal.

9. A method of improving the black color of dichroic dyes for use in black liquid crystal displays, comprising the steps of: adding to a host liquid crystal material a dye composition having a mixture of dichroic dyes of various colors in proper proportion to obtain a material which absorbs radiation in the spectral range of about 400–700 nm; selecting at least one of the dichroic dyes of various colors to be a yellow azo dichroic dye having the general formula:

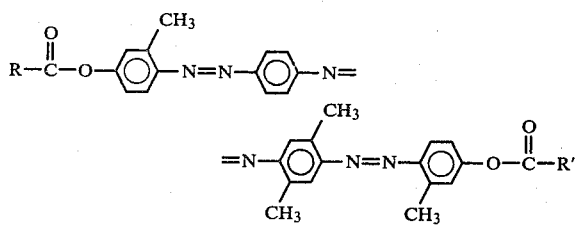

wherein R and R' are individually alkyl or halogen, nitro, amino, hydroxy or cyano substituted alkyl and the alkyl has from about 4 to about 20 carbon atoms, phenyl; phenylalkyl; halogen, nitro, cyano, hydroxy, dialkylamino, amino, alkyl, phenyloxy, phenyl, or alkoxy parasubstituted phenyl or phenylalkyl; or 3,5-dialkoxyphenyl radical; and heating the composition to dissolve the dyes in the liquid crystal host material.

10. The method of claim 9, wherein about 0.05% to about 1.0% of the yellow azo dichroic dye is added to the host liquid crystal material and the dichroic dyes of various colors.

11. The method of claim 9, wherein R=R'.

12. The method of claim 9, wherein R and R' are alkyl having from 4 to about 20 carbon atoms or the halogen, nitro, amino or cyano derivatives thereof.

13. The method of claim 9, wherein the mixture is heated to about 60° C. to about 105° C. to dissolve the dichroic dyes in the host material.

14. The method of claim 9, wherein the phenyl or phenylalkyl parasubstituent is selected from the group consisting of halogen, hydroxy, nitro, cyano, amino, alkyl, phenyloxy and alkoxy.

15. An improved black dichroic liquid crystal display composition comprising:
   a host liquid crystal material; and
   a dye composition dissolved in said host, the dye composition having a mixture of dichroic dyes of various colors in proper proportion to obtain a material which absorbs radiation in the spectral range of about 400–700 nm wherein at least one of the dichroic dyes of various colors is a yellow azo-dichroic dye having the general formula:

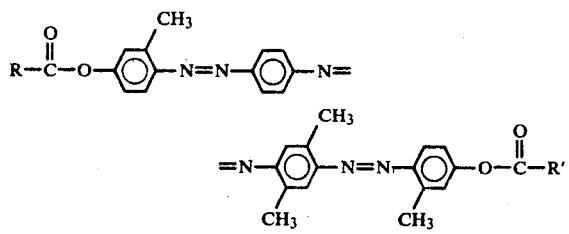

wherein R and R' are individually alkyl or substituted alkyl, and the alkyl has halogen, nitro, amino, hydroxy, or cyano substituted alkyl, and the alkyl has from about 4 to about 20 carbon atoms, phenyl; phenylalkyl; halogen, nitro, cyano, hydroxy, dialkylamino, amino, alkyl, phenyloxy, phenyl, or alkoxy parasubstituted phenyl or phenylalkyl; or 3,5-dialkoxyphenyl radical.

16. The black dichroic liquid crystal display composition of claim 15, comprising about 0.05% to about 1.0% by weight (based upon the weight of the liquid crystal) of the yellow azo dichroic dye.

17. The black dichroic liquid crystal display composition of claim 15, wherein R=R'.

18. The black dichroic liquid crystal display composition of claim 15, wherein R and R' are alkyl having from 4 to about 20 carbon atoms or the halogen, nitro, amino or cyano derivatives thereof.

19. The black dichroic liquid crystal display composition of claim 15, wherein the phenyl or phenylalkyl parasubstituent is selected from the group consisting of halogen, hydroxy, nitro, cyano, amino, alkyl, phenyloxy and alkoxy.

20. The dye composition of claim 15, wherein R and R' are 4-pentoxyphenyl.

21. The composition of claim 15, wherein the host material comprises a nematic liquid crystal or a cholesteric liquid crystal.

* * * * *